United States Patent [19]
Collins et al.

[11] Patent Number: 5,577,919
[45] Date of Patent: Nov. 26, 1996

[54] METHOD AND APPARATUS FOR AUTOMATED LEARNING AND PERFORMANCE EVALUATION

[76] Inventors: Deborah L. Collins, P.O. Box 667, Woodland Park, Colo. 80866; Anne S. Blocker, 1422 Harbor View, Galveston, Galveston County, Tex. 77550

[21] Appl. No.: 507,642

[22] Filed: Jul. 25, 1995

Related U.S. Application Data

[63] Continuation-in-part of Ser. No. 682,428, Apr. 8, 1991, Pat. No. 5,437,553.
[51] Int. Cl.⁶ .................................................. G09B 5/00
[52] U.S. Cl. ........................ 434/322; 434/323; 434/335
[58] Field of Search ................................. 434/322, 323, 434/327, 335, 336, 350–353, 362, 365

[56] References Cited

U.S. PATENT DOCUMENTS

| | | |
|---|---|---|
| 4,829,431 | 5/1989 | Ott et al. . |
| 4,877,408 | 10/1989 | Hartsfield . |
| 4,941,829 | 7/1990 | Estes et al. ........................... 434/335 |
| 5,002,491 | 3/1991 | Abrahamson et al. . |
| 5,035,625 | 7/1991 | Munson et al. . |
| 5,059,127 | 10/1991 | Lewis et al. . |
| 5,180,309 | 1/1993 | Egnor . |

Primary Examiner—Richard J. Apley
Assistant Examiner—Glenn E. Richman
Attorney, Agent, or Firm—Baker & Botts, L.L.P.

[57] ABSTRACT

A method and apparatus is provided for automated learning and performance evaluation of a group of items by a user. The apparatus, which can be a digital computer, has an imput for receiving a user's response, a display for presenting the material to be learned and logic for sorting the items and responses. The method, which can be practiced on a digital computer, has steps of querying the user as to whether items are believed to be known or unknown, sorting the items into groups of perceived known and unknown items and generating a sequence of items to be displayed. An important feature of this invention is that the user's biological needs for learning are matched automatically with an apparatus employing a method that leaves the user with no opportunity to fail. Unusual learning results are obtained from an unobvious method.

12 Claims, 8 Drawing Sheets

METHOD AND APPARATUS FOR AUTOMATED LEARNING AND PERFORMANCE EVALUATION

RELATED APPLICATIONS

This application is a continuation-in-part of U.S. application Ser. No. 07/682,428, filed Apr. 8, 1991, U.S. Pat. No. 5,437,553 issued Aug. 1, 1995, and entitled "Method and Apparatus for Automated Learning and Performance Evaluation" by Deborah L. Collins and Anne S. Blocker. This application is related to U.S. application Ser. No. 08/428,890, filed Apr. 25, 1995, now pending.

TECHNICAL FIELD OF THE INVENTION

This invention relates generally to an educational training teaching tool and more specifically to a method and apparatus for automated learning and performance evaluation.

BACKGROUND OF THE INVENTION

There are many factors that contribute to the way people learn. These factors include the way in which the information or material is presented (i.e., the teacher), the way in which the individual processes and recalls information, biological predispositions toward information processing, multiple forms of intelligence, the repetition rate at which the information is presented, individual attention span, the base of information already known by the individual, and perhaps most important of all, the individual's learning style and receptivity toward learning and learned material, this includes the role of emotion in learning and performance.

With this in mind then, the design of automated learning systems is difficult at best. When these systems are to be applied to the general public having diverse backgrounds and cultural differences, the problem becomes monumental. This problem is not just associated with "classroom" situations but with electronic games, military and corporate training, remedial education, coaching and a myriad of other teaching, selling, public education, learning and therapeutic situations.

Accordingly, a need exists in the art for an automatic teaching system and learning method which adjusts for learning speed, learning style, cultural differences and previously learned material and which allows a student to be receptive over extended periods of time to the material to be learned.

A need also exists in the art for taking any material to be learned and presenting that material to a student or user in an order and manner tailored to the learning receptivity of that student or user and in a pattern easily assimilated by that student.

A further need exists for a performance method which provides a specific quantitative measurement of the student's confidence level and self-esteem for specific learned material independent of that student's knowledge of the material.

A need exists in the art for a method of teaching students with a variety of problems affecting eye movement and need for stimulation. These students are typically labeled by schools as learning disabled, gifted, minimally brain injured, dyslexic and attention deficit disorder and often present problems in classroom management by exhibiting socially unacceptable behavior.

A need also exists in the art for a method of accelerating learning for a variety of applications including corporate and military training, exam preparation and advanced placement examination.

A need also exists in the art for a method for job training and literacy training which will enable students with prior school failure and prior drug use to achieve academically.

A need also exists in the art for a method of basic academic training that works with prisoners, violent students and students from inner city neighborhoods.

SUMMARY OF THE INVENTION

In one embodiment of the invention an apparatus is provided for teaching a group of items to a user or evaluating performance of the user. The apparatus comprises means for displaying each of the items to the user. The apparatus further comprises means for receiving a response from the user and logic means, responsive to the user's response, for sorting the items into two groups of known and unknown subjective items. The apparatus further comprises means for generating a sequence of subjective items, including at least one each of the known and unknown subjective items, and supplying the sequence to the display means.

A technical advantage of the apparatus of the present invention is that a group of items can be learned faster and more completely with better retention. Another technical advantage is that boredom is used advantageously in the learning process. Another technical advantage is that the receptivity of the user is improved by employing high repetition rates for newly learned facts. It is still a further technical advantage of the invention that there is provided an apparatus which creates a pattern of known and unknown material and which adjusts the pattern to suit the individual user. It is still a further technical advantage of the invention to provide an apparatus for individualized instruction from a single set of material, customized for each individual student or user that can be taught in a way best enabling a student to learn the material.

In another embodiment of the invention a method is provided evaluating performance of a user or for teaching to a user a group of items where each of the items is paired to a specific response. The method includes the following steps performed in this or a different order: One, the user is queried directly, or indirectly, as to whether each item in the group is known or unknown. Two, the group of items are sorted into a first group of known subjective items and a second group of unknown subjective items. Three, a sequence of the subjective items is generated including at least one each of the known and unknown subjective items. Four, the sequence of subjective items is displayed in the following manner: If the item is an unknown subjective item, then the item and its paired response are displayed together, if the item is a known subjective item then the item is displayed at a first time and the paired response is displayed at a later time.

One technical advantage of the invention is that a method is provided for teaching to a user a group of items where each of the items is paired to a specific response. Another technical advantage of the method of the present invention is that the items and their paired responses are sorted into groups of known and unknown material based on a user's subjective response. Still another technical advantage of the method in accordance with the present invention is that the material is displayed to the user in such a way that unknown items are presented with their paired response at the same time while known items are displayed first while the paired response is displayed at a later time.

A technical advantage of the invention is that a method is provided for presenting the paired items in a timing frequency that matches the user's subjective response while always maintaining repetitions simulating the frequencies of brainwave patterns.

A technical advantage of the invention is that a method is provided to limit the width of the presentation to an optimal width that is no wider than the field of constant vision (without eye movement) at the correct distance for visual acuity.

Another technical advantage of the invention is that a method is provided for presenting the paired items in such a way that the letters move across or down the screen so that the user's eyes do not have to track the letters. In the invention, the letters move at rates rapid enough to allow for cognition and comprehension to take place even when reading speeds for the same student may be considerably slower and not yet fast enough for comprehension to occur with the use of static text.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE INVENTION

Using repetition for instructional purposes is well-known in the prior art. Such methods are used for learning associated terms like vocabulary words, a foreign language, names and numbers. Each of the items to be learned has an associated paired response. In the prior art, the material may be presented either in print or electronically as a set of flash cards or visual display screens with a question and answer (a fact and a definition) all in the form of a selected item and paired response.

In one prior art method using a set of flash cards, the flash cards are separated into separate groups or sets of flash card chunks to be learned. The information is learned one chunk at a time by simply studying the cards and performing self-tests. Cards that are tested correctly are set aside while cards that are tested incorrectly are repeated until learned. When one group or chunk is learned, another group is studied until that group is learned. The process continues until all cards in all groups are learned.

In another prior art method, the items to be learned are separated by a test into groups of known and unknown items. The user then focuses on studying and repetitive learning, including the self-testing process, of the unknown items. As an unknown item is learned, it is transferred to the known items until all unknown items are learned.

Figure 1:
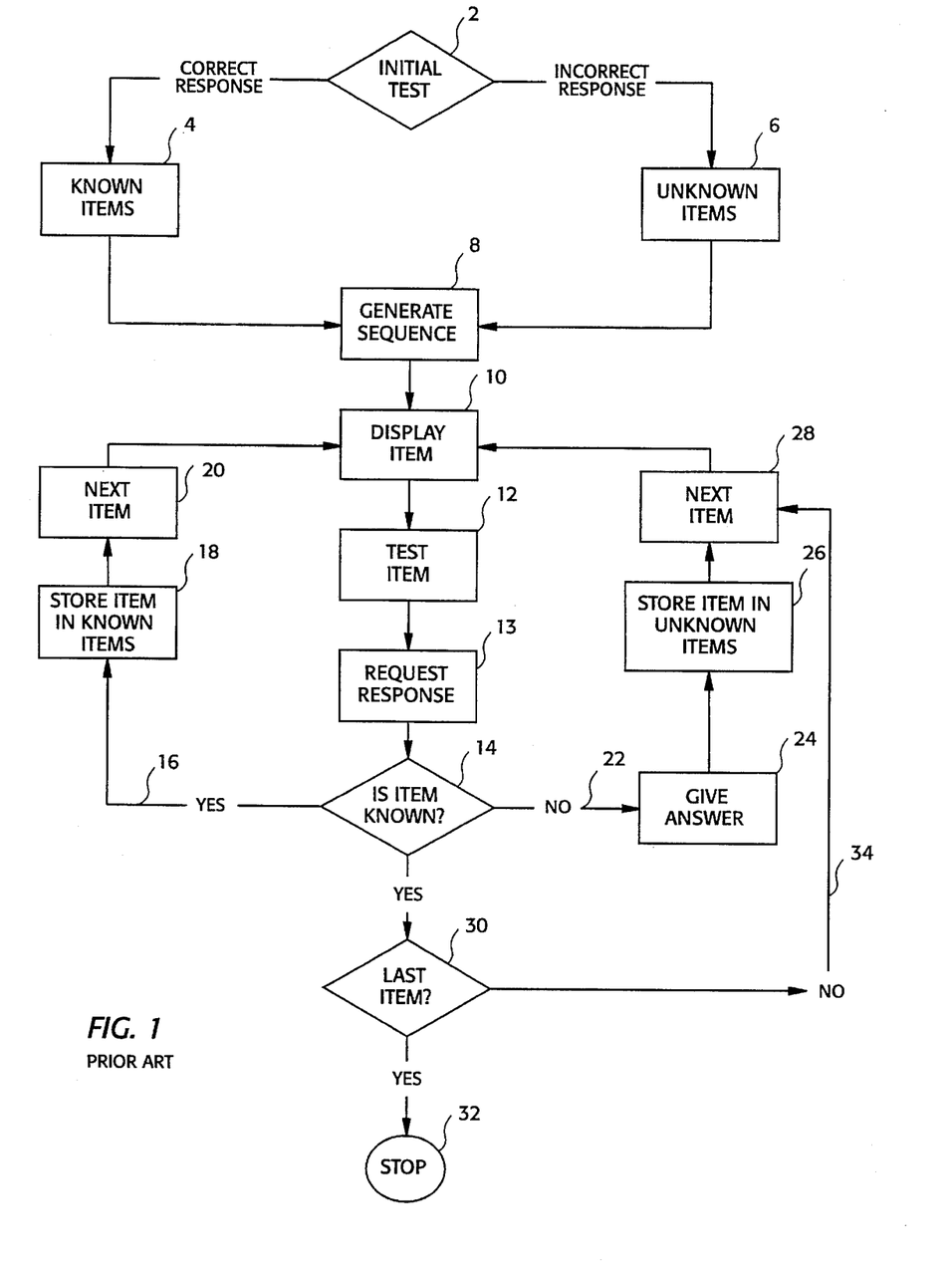
FIG. 1 illustrates a block diagram of a prior art system using repetition for instructional purposes.

In another prior art method shown in FIG. 1, a group of items to be learned is separated by an initial test 2 into two groups of known items 4 and unknown items 6 based on the user's actual knowledge, not his perceived knowledge. Once the items have been separated into the two groups, a sequence of known and unknown items is generated at a sequence generator 8. Each of the items in the sequence is then presented on a display 10 and then tested 12.

The user is then presented with the test item and required to give a response at step 13. The response is evaluated at decision point 14. If the answer is correct, then the method follows along the path 16 and the item is then stored 18 in the collection of known items 4 and the next item in the sequence is incremented at step 20 and the process continues.

If the response evaluated at decision point 14 is incorrect, then the method follows along path 22 to step 24 where the user is provided the answer or paired response to the item. The process continues and at step 26 the item is stored in the collection of unknown items 6. At step 28 the sequence is incremented and the next item in the sequence is displayed. Returning to decision point 14, if the item is known, the method determines at step 30 whether the item is the last item to be learned; if it is, the process stops at step 32, if not, and there are items remaining, the process continues along path 34 and the next item in the sequence is incremented and the process continues.

Figure 2:
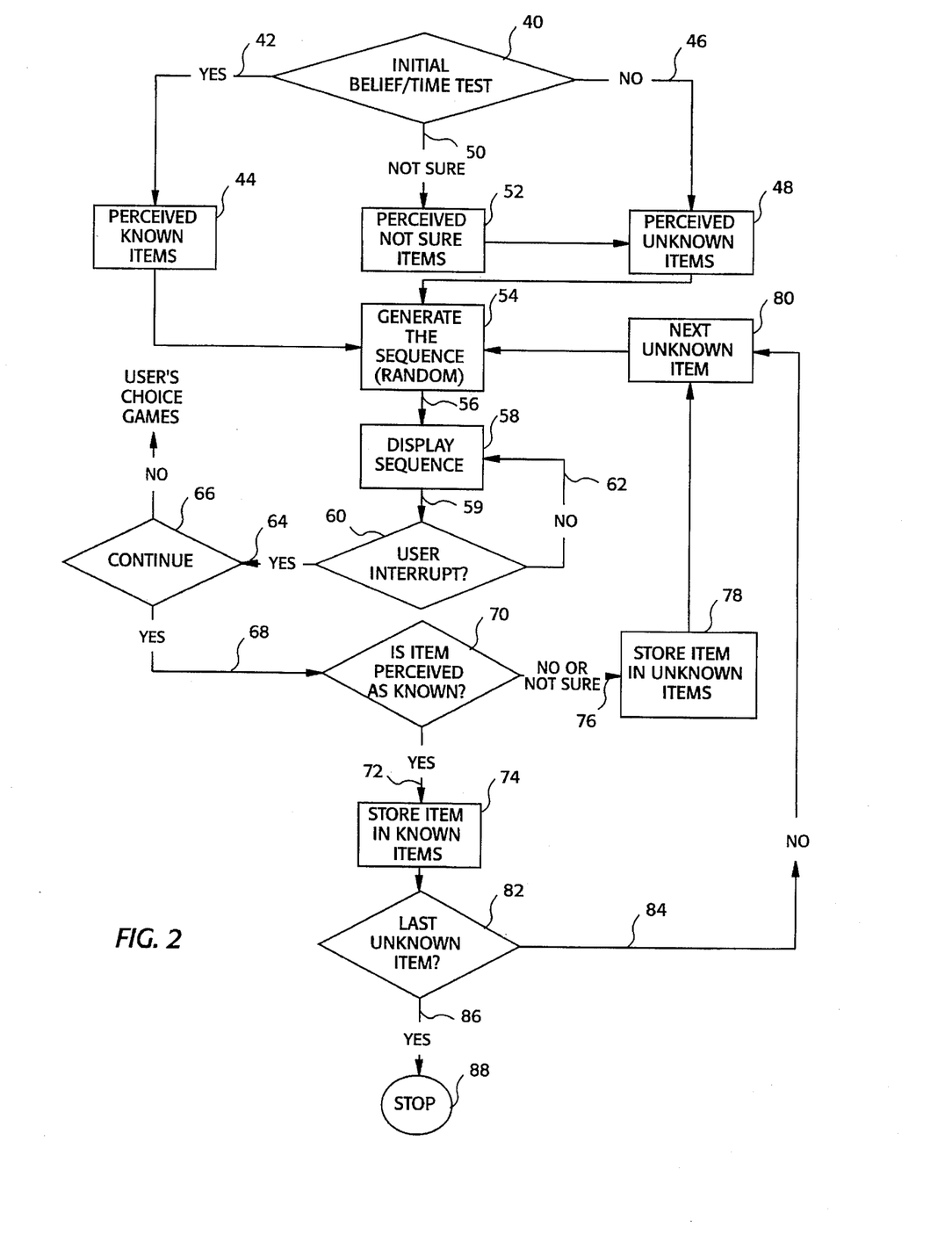
FIG. 2 illustrates a block diagram of one embodiment of a method in accord with the present invention.

In one embodiment of the present invention shown in FIG. 2, a method is provided that separates the items to be learned or for use in measuring performance into three groups based entirely on the user's perception of whether he knows the item not on the basis of whether the item is actually known or unknown. It should also be understood that the terms "known" and "unknown" represent a relative multilevel degree of knowledge and not an absolute binary knowledge. It should also be understood that any perceptible factor can be substituted for the known and unknown items described in the preferred embodiments. For example, this invention can be used to test for use or nonuse. A further refinement of the sorting process sets a time limit for receiving the user's subjective response. In this method, beginning with step 40, the user is provided with an item and given an initial test as to whether he believes he knows the answer or not. Also, there is a clock running, unseen and unknown by the user, that times the response. It should be emphasized that in this test, the user is asked whether or not he knows the item, not tested on the item. If the user states that the answer is known, then the process follows path 42 and the item is stored in the perceived known items category 44. If the user responds that the item is not known, the process follows path 46 and the item is stored in the perceived unknown items category 48. If the user responds that he is not sure whether the item is known or unknown, then the process follows path 50 and the item is stored in the perceived not sure items category 52. It is also noted that if the user fails to give a response within the predetermined time period, then the item is treated as an unknown item and stored in perceived unknown items category 48. The perceived not sure items in category 52 are combined with the perceived unknown items in category 48 and are called subjectively unknown items. The subjective unknown items together with the perceived subjective known items are directed to sequence generator 54 which creates a sequence or list of unknown and known subjective items. In the preferred embodiment, the sequence will include at least one unknown item and a plurality of randomly selected known items. The subjective unknown items can be thought of as arranged in order from 1 to N where N is the total number of subjective unknown items. The sequence generator 54 selects the first subjective unknown item and combines that with the randomly selected subjective known items to generate the sequence. Once the sequence is generated, the process follows along path 56 and the first item in the sequence is then displayed to the user by display 58. The method will continue displaying each item in the sequence until such time as a user interrupt occurs. The item can be displayed visually or auditorily in a variety of ways including animation, color adaptation, repetition, position, dimensional, sound and rhythm. In this way there is a continued repetitious presentation of the subjective unknown item along with randomly selected subjective known items.

Figure 8:
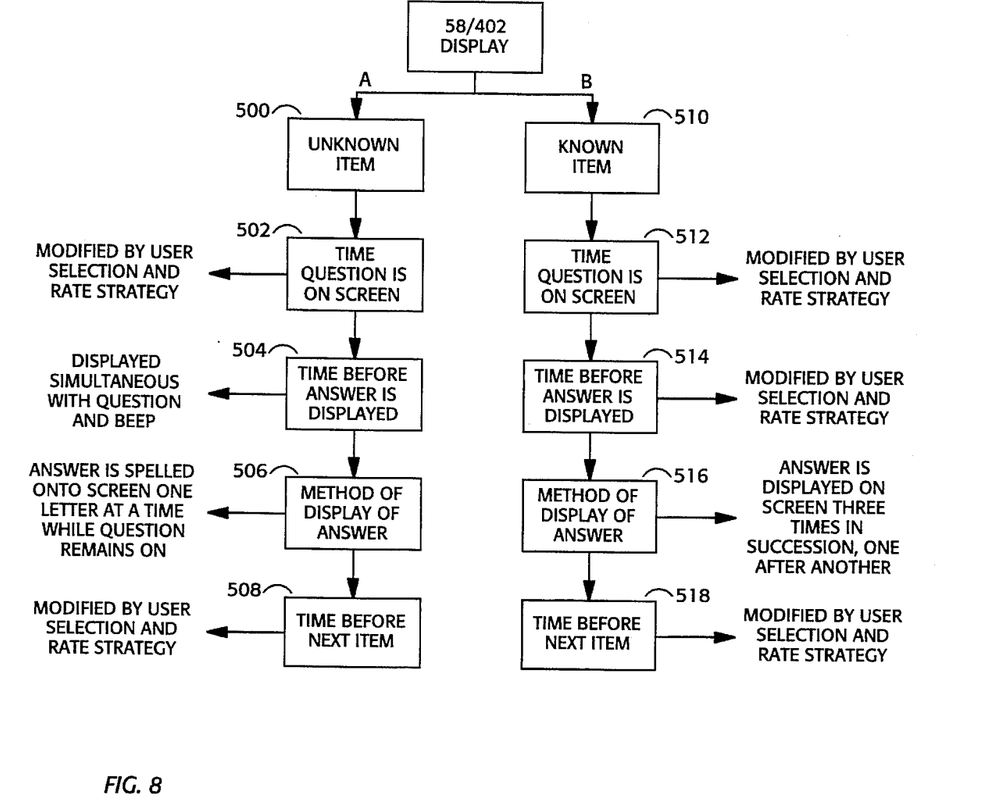
FIG. 8 illustrates a block diagram of a timing and movement sequence used in connection with display 58 and 402 of the present invention.

The timing of the display 58 is further illustrated in FIG. 8. The timing of the display (i.e. how long the known or unknown item is visible, how much time elapses before displaying the second half of the known's pair, how quickly to display the next pair in the sequence) is adjusted by the user as well as by the method—making certain that the very rapid repetitions simulating beta brainwave patterns are maintained.

The items are also displayed in such a way that the user's eyes do not have to track across the display in the same way as for static text utilizing the advantages of movement cognition. The items can be displayed one letter or section at a time. In static text, the eyes must track across letters to form words and across words fast enough (60 words/minute) to create comprehension and meaning. In the invention, the letters move at rates rapid enough to allow for cognition to take place even when reading speeds for the same user may be considerably slower than the rate of presentation of questions, answers and individual moving letters or words. For example, it is possible to have a student reading letters at the rate of 500 words per minute in order to learn while the same student may only be able to track words at 60 words per minute when eye movement is required. The invention allows the student to select and maintain optimal learning rates for different subject material to be learned. While the invention adjusts to the preferred learning style of the student, students are allowed control over the optimal rate for each different subject matter and for whether the material is previously known, unfamiliar or totally unknown.

Now following along path 59 to user interrupt 60, the method determines whether the user has chosen to interrupt the presentation. If not, the process follows path 62 and returns to display 58 where the next item in the sequence is presented. If there is a user interrupt detected at user interrupt 60, the process follows path 64 to decision block 66 where the method determines whether the user should continue with the current sequence or divert to other activities. If the method continues with the current sequence, the process follows path 68 to decision block 70. At decision block 70, the user is queried about the item and is asked whether the item is perceived as known or unknown. Again, this is a subjective test only. If the item is perceived known, the method follows path 72 and the item is stored at step 74 in perceived known items 44. After the item is stored at step 74, the method checks at decision block 82 to see whether the unknown item is the last unknown item. If the item is not the last unknown item, the method follows path 84 to next unknown item selector 80 which selects the next unknown item and passes control to sequence generator 54 for generating new sequence. Returning to decision point 82, if the unknown item was the last unknown item, then the process follows path 86 and stops at point 88.

Returning to decision point 70, if the item is perceived as unknown, or the user is not sure whether the item is known or unknown, the process follows path 76 and the item is stored at step 78 in perceived unknown items 48. After the item is stored, the next unknown item is selected at next unknown item selector 80 and a new sequence is generated by sequence generator 54.

Figure 3:
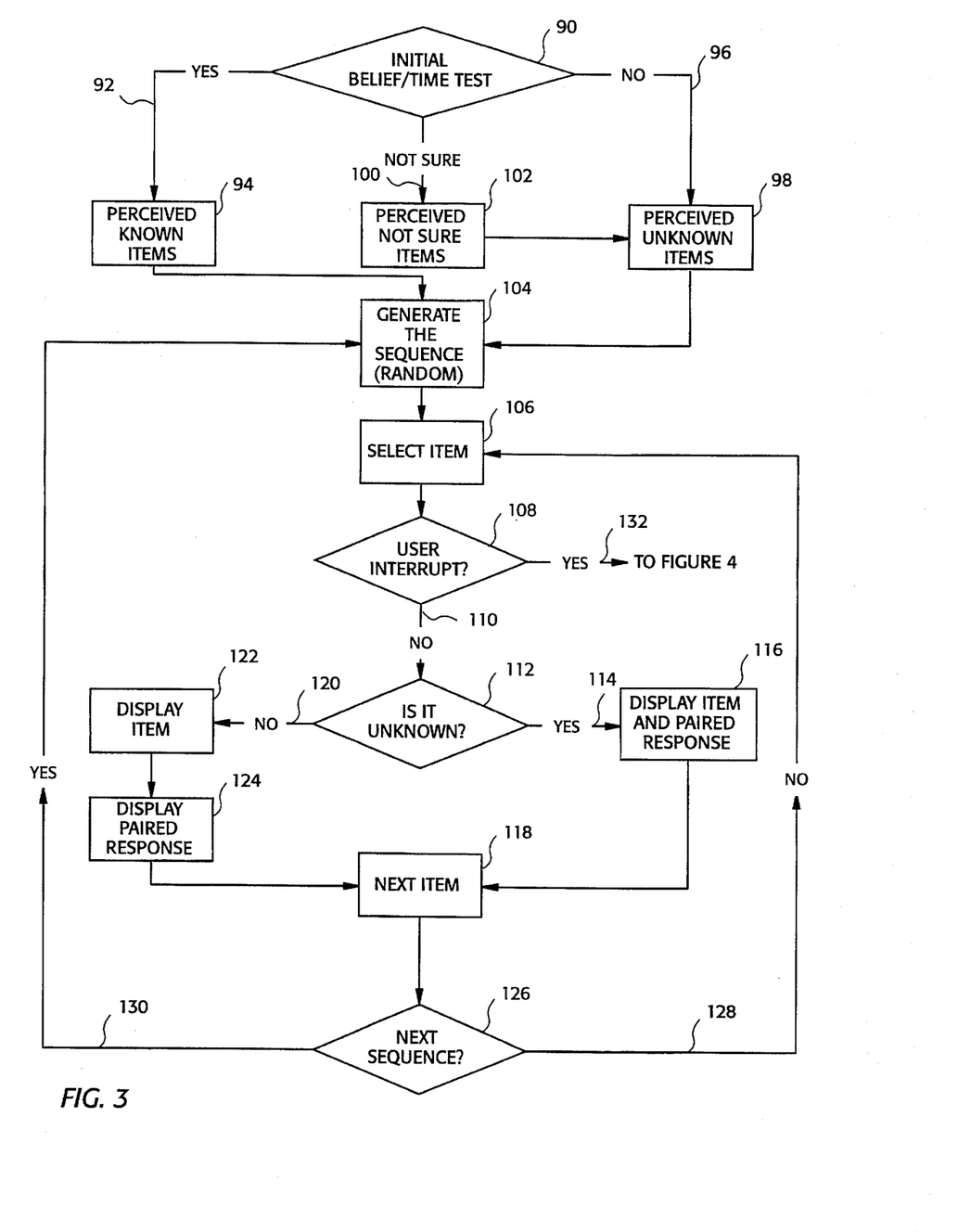
FIG. 3 illustrates a block diagram of a second embodiment of a method in accord with the present invention.

Referring now to FIG. 3, an alternative embodiment of the method in accord with the present invention is shown. In this method, each of the items in a group of items to be learned has an associated paired response. In initial step 90, the user is queried as to whether he believes he knows the item and its paired response. The user is not asked to give or provide the paired response at this time. Also the response is timed and if a response is not given within a predetermined time T, then the item and its paired response are treated as a perceived unknown item. If the user responds that he knows the item and its paired response, the process follows path 92 and the item with its associated paired response is stored in an array 94 labeled perceived known items. If the user fails to respond within time T or responds that the item is not known, then the process follows path 96 and the item is stored in array 98 as a perceived unknown item. If the user responds that he is not sure whether the item is known or unknown, the process follows path 100 and the item is stored in array 102 as a perceived not sure item. The items in arrays 98 and 102 are combined in a single table of unknown items.

When all the items in a group of items to be learned have been sorted into the various arrays, the process continues to the step of generating a sequence of subjective items. Sequence generator 104 produces a sequence or list of perceived known items and perceived unknown items. In the preferred embodiment the sequence generally consists of a single perceived unknown item and a plurality of randomly selected perceived known items. Once the sequence has been generated by sequence generator 104, the first subjective item in the sequence is selected at item selector 106.

At anytime after the item is selected, the user is permitted to interrupt as shown at step 108. If there is no user interrupt, the process follows path 110 to determine whether the selected subjective item is a perceived known or perceived unknown item at step 112. If the item is a perceived unknown item, then the process follows path 114 and both the item and its paired response are displayed to the user simultaneously at display 116. After the item and its paired response are displayed at step 116, the list of sequenced items is incremented and the next item is incremented at step 118. If the item selected at step 106 is a perceived known item, then the process follows path 120. The perceived known item is displayed at display item step 122 at a first time. Then at a later time, the associated paired response is displayed to the user at display paired response step 124. After the associated paired response is displayed at step 124, the list of sequenced items is incremented by the next item at step 118. After the sequence has been incremented, the process determines at step 126 as to whether the sequence is completed, if not, then the process follows path 128 and the next item is presented. If the item is the last item in the sequence, then the process follows path 130 and a new sequence of subjective items is generated by sequence generator 104.

Figure 4:
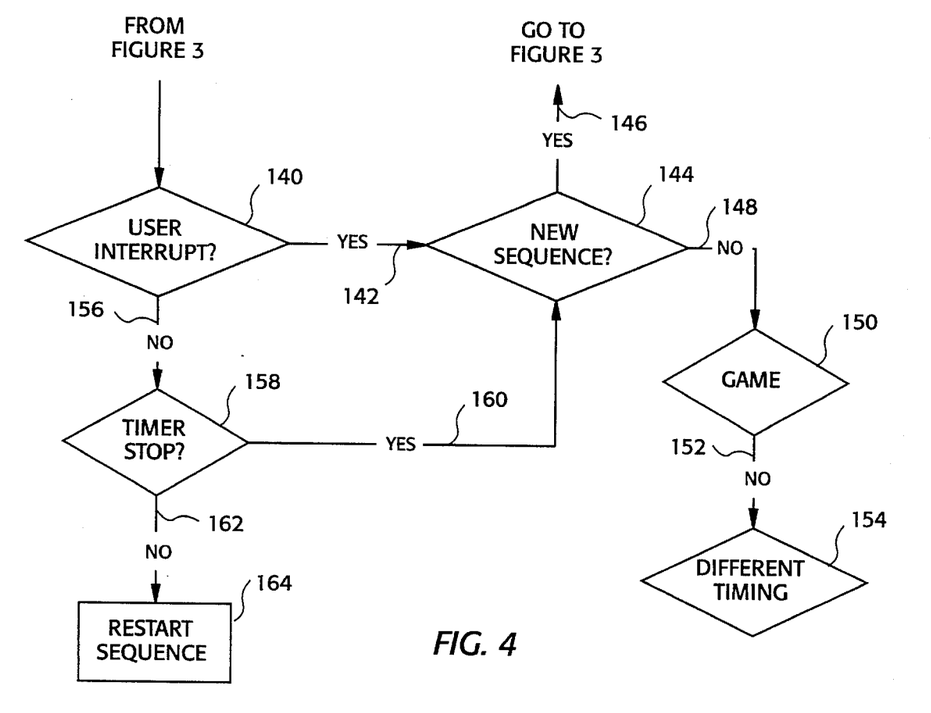
FIG. 4 illustrates a block diagram of an interrupt sequence used in connection with the method of the present invention.

One unique feature of the method of the present invention is the novel way it permits the user to interrupt the learning process at any time. Still referring to FIG. 3, if a user interrupt is detected at step 108, the method branches along path 132 to FIG. 4. Referring now to FIG. 4, the unique interrupt feature of the present invention is described. Decision box 140 is activated at the step in the process of FIG. 3 shown at 108. If the system determines that the user has actually activated the interrupt, the process follows path 142 and the user is queried at decision block 144 as to whether he wishes to begin a new sequence or not. If the user selects to initiate a new sequence, the process branches through path 146 back to sequence generator 104 (FIG. 3). Sequence generator 104 is activated to select a new unknown and generate a new sequence for continuing the method. If the user decides not to select a new sequence and responds NO, the process may follow path 148 and the user is queried at game step 150 as to whether he wishes to divert his attention. If yes, the process branches to a set of games that are specifically designed to help alleviate boredom, improve the user's attention span or teach some other aspect of the paired association such as exact spelling. There can also be games of any conventional sort such as Hangman, etc. If the user decides not to select a game, the process continues down path 152 and the user is at step 154 asked whether he would like a different test or different learning scheme such as the performance evaluation illustrated in FIG. 5. If the user answers YES, the process branches to the new Test. If the user responds NO, then the method stops.

Returning now to user interrupt 140, should it be determined that it was not the user that interrupted the method, the process follows path 156 and determines at timer 158 whether the timer timed out. In one embodiment, the method is provided with a timer to measure the user's response time. It also functions, when used in connection with a stored program digital computer and display, to time out automatically and stop in the event that the user is no longer working with the device. In another embodiment, timer 158 can be a counter used to measure cycling by counting the number of times an unknown has been repeated. If the user is cycling too fast, the method can automatically initiate new sequence 144 or different testing 154. If the user is cycling too slowly, the method can branch to a prescriptive game 150 or other activity. If timer 158 has timed out, then the process follows path 160 and returns to decision point 144 and may ask the user whether he wishes to choose a new sequence. If it is determined that the timer has not stopped, the process follows path 162 and the sequence is restarted at step 164 and the process continues.

Figure 5:
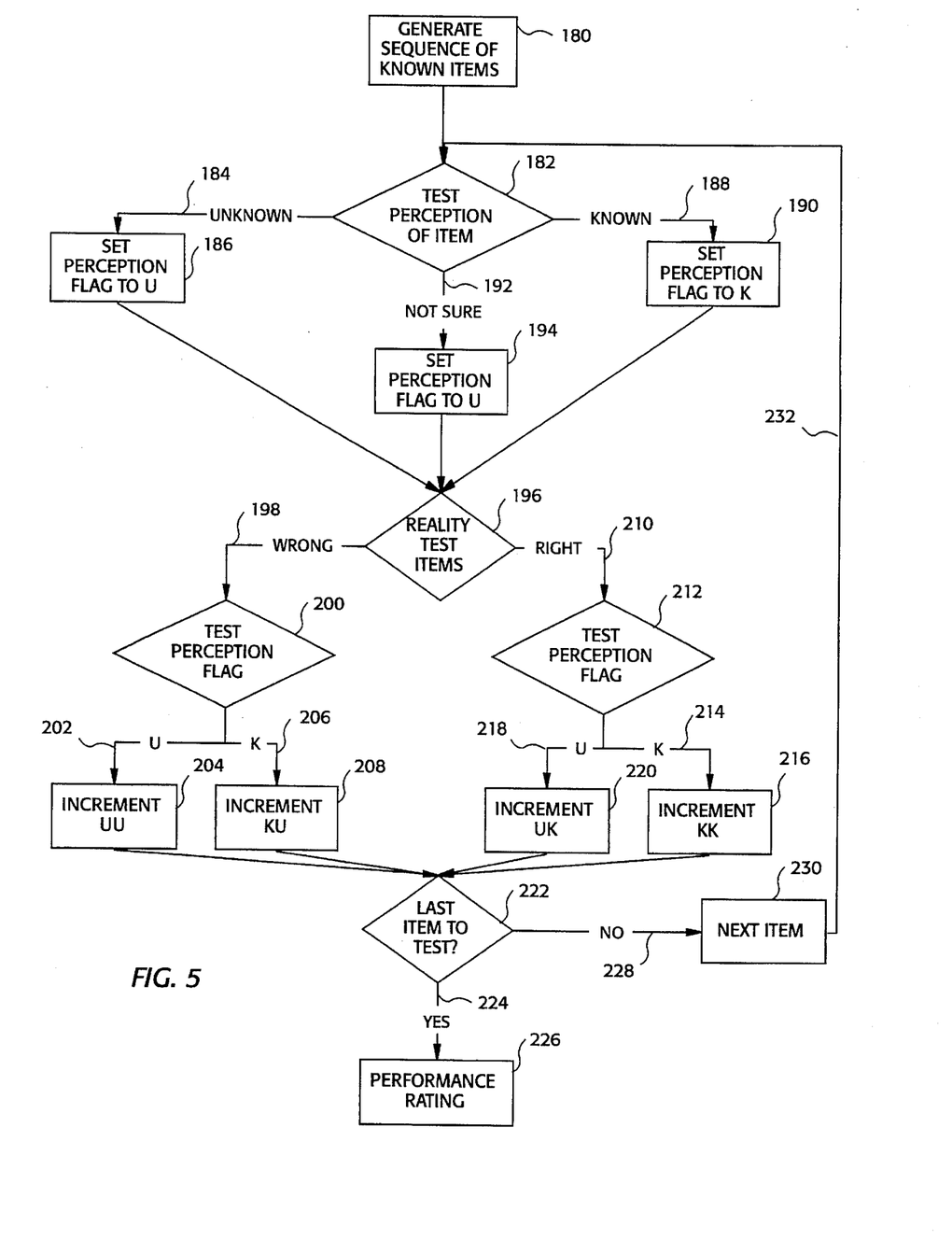
FIG. 5 illustrates a block diagram of a third embodiment of the method in accord with the present invention.

Referring now to FIG. 5, another embodiment of a method in accordance with the present invention is described directly related to evaluating performance. Beginning at step 180, a sequence of items is generated and presented to the user one item at a time at test perception step 182. In step 182, the user is asked whether he knows the item, whether he does not know the item or whether he is not sure if the item is known or unknown. Again, it must be emphasized that what this invention seeks to determine is not whether the item is actually known or unknown, but whether the user believes the item is known or unknown.

If the user responds at step 182 that he does not know the item, the process follows path 184. At step 186, a perception flag is set, in this case a "U" for unknown. If the user responds that he does know the item, the process follows path 188 and the perception flag is set to "K" for known at step 190. If the user responds that he is not sure whether the item is known or unknown, the process follows path 192 and the perception flag is set to "U" for unknown at step 194.

After the perception flag has been set, the item is presented to the user and he is queried as to his actual knowledge of the item. This occurs at reality test step 196 where the user is asked to provide an appropriate response. If the response is incorrect or wrong, the process follows path 198 where the perception flag is tested at step 200. If the flag was set to U, the process follows path 202 and the UU counter is incremented by one at 204. If the perception flag is set to "K", the process follows path 206 and the "KU" counter is incremented by one at step 208.

Returning to test block 196, if the user provides the correct or right response, the process follows path 210 and the perception flag is tested at step 212. If the perception flag had previously been set to "K" for known, the process follows path 214 and the "KK" register is incremented by one at step 216. If the perception flag was set to "U", the process follows path 218 and the "UK" register is incremented by one at step 220. After the appropriate registers have been incremented in steps 204, 208, 216 and 220, the process determines whether the item is the last item in the sequence at counter 222. If it is the last item in the sequence, the process moves along path 224 to performance rating step 226. If the item is not the last item, the process follows path 228 and at step 230 the sequence of items is incremented by one and returned along path 232 to test perception block 182. One method of rating or evaluating performance is to divide the sum of registers 204 and 216 by the sum of registers 204, 208, 216 and 220 expressing the result as a percentage referred to as a current measure of knowledge. Another performance evaluation is calculated by taking one minus the sum of registers 208 and 220 divided by the sum of registers 204, 208, 216 and 220 expressed as a percentage referred to as a measure of performance ability. Other performance rating calculations are well-known to those of ordinary skill in the art.

Figures 6A, 6B, 6C, 6D:
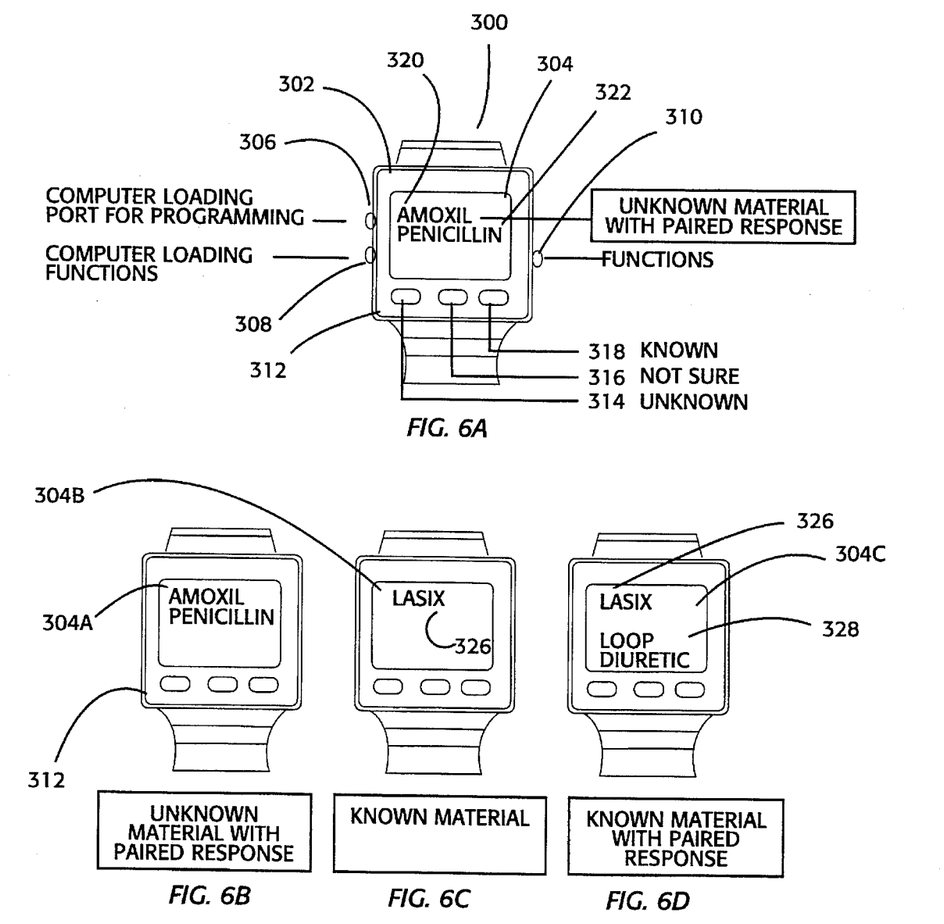
FIG. 6 illustrates a first embodiment of an apparatus of the present invention showing different displays of known and unknown items in accord with the learning method of the present invention.

Referring now to FIG. 6, an apparatus for practicing the invention is shown as a wrist-mounted computer with a visual display. It should also be known that the display can be either an audio annunciator or the combination of a visual and audio display. Referring to FIG. 6, the improved learning apparatus is shown generally at 300 and consists of a housing 302, a display 304, ports 306 and 308 that interface an external general purpose computer with the internal computer or microprocessor (not shown). Function switch 310 is used to control apparatus functions such as ON/OFF. Shown generally at 312 are the input devices which can be standard pressure sensitive switches labeled "Unknown" 314, "Not Sure" 316 and "Known" 318.

Not shown in FIG. 6, but well-known to those having ordinary skill in the art, is a conventional computer system or microprocessor possessing standard processing, memory and I/O functions. In the memory would be stored a list or file of data consisting of the items or a group of items to be taught to the user. In this case, shown on display 304 are the two names of a drug, the tradename and its generic name (the item and its paired response). Display means 304 flashes the item 320, in this case the word, "amoxil", and the paired response 322 beneath it in this case the word, "penicillin".

After the item 320 and its paired response 322 are flashed and presented on display 304, switches 314, 316 and 318 are activated as means for receiving a response from the user. If the user believes that he knows the association between amoxil and penicillin, he depresses "Known" switch 318. If, on the other hand, the user does not know the relationship, he depresses "Unknown" switch 314. If the user is unsure as to whether the relationship is known or unknown, he presses "Not Sure" switch 316. Using standard computer techniques, the input from switches 312 is fed to the logic means of the microprocessor which labels the item as "Known" if switch 318 was activated by the user or "Unknown" if either switches 314 or 316 are activated by the user. The system continues displaying the various items 320 with the associated paired response 322 and querying the user for his perception until the list of items is completed. Once the list or sequence is completed, the microprocessor, through its stored program, generates a new list or sequence of the items to be learned, including at least one each of the known and unknown subjective of items.

Still referring to FIG. 6, there are shown three separate displays 304A, 304B and 304C illustrating how the items 320 and the paired response 322 are presented to the user in a sequence. Beginning with 304A, both the unknown item 320 with its paired response 322 is shown on the display. At anytime after the first unknown is displayed more than once, the user can activate any of switches 312 to interrupt the process. Once unknown item 320 is displayed with its paired response 322, the system presents a known item 326 on display 304B. After a suitable time delay, the paired response 328 to item 326 is displayed together and presented to the user on display 304C.

Figure 7:
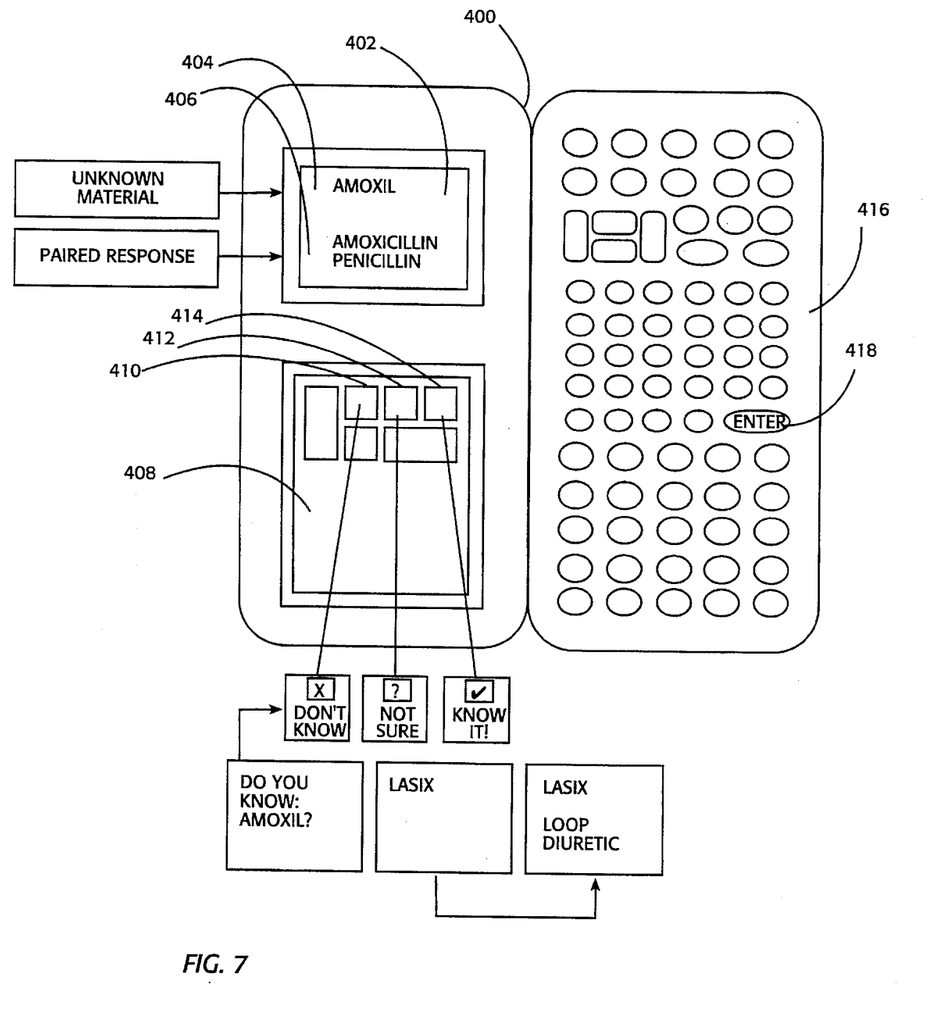
FIG. 7 illustrates a second embodiment of an apparatus of the present invention and for practicing the methods of the present invention.

Referring now to FIG. 7, an alternative embodiment of an apparatus in accordance with the present invention is shown generally as computer 400. Similar to the computer shown in FIG. 6, this computer employs a standard microprocessor with conventional internal arithmetic and logic functions, conventional I/O handling and off-chip memory in RAM, ROM or other suitable memory device. As these items are well-known to those persons of ordinary skill in the art, they are not shown. Referring now to computer 400, there is a display 402 which in the preferred embodiment is a liquid crystal display for presenting an item 404 and its associated paired response 406 to the user. In this case, the item 404 is material not known or believed to be not known by the user and referred to as unknown material. At input pad 408, various input devices are shown consisting of conventional pressure activated switches 410, 412 and 414 for receiving a user response. Switch 410 indicates that the user perceives he does not know the item. Switch 412 indicates that the user is not sure whether the item is known or unknown and switch 414 indicates that the user perceives he does know the item. Also shown is keyboard 416 consisting of a full set of alpha numeric keys as well as various control keys. Keyboard 416 permits for vastly increased user input. For instance, in one embodiment of the invention, the user is permitted at anytime to interrupt the learning process and activate a game or another learning module. For instance, by activating the enter key 418, the process of displaying the group of items would be halted and the user would be asked whether he wished to continue, start the sequence over, use a new sequence, play a game or some other activity.

In an alternative embodiment of computer 400, a method in accord with the present invention is contained on external memory. The external memory can be any of the type such as a floppy disk (both 5¼" and 3½" varieties) a card or other chip type memory such as RAM or ROM. In this embodiment, a device is provided for configuring computer 400 to perform either a method of teaching a user or evaluating user performance by presenting a group of items. The device has means for configuring input pad 408 to query the user as to whether an item is perceived known or unknown. The device has means for configuring the processor of computer 400 to sort each of the items into a group of perceived known items and a second group of perceived unknown items. The device also has means for configuring the processor of computer 400 to generate a sequence of subjective items including at least one of said first group and one of said second group. The device is provided with means for configuring display 402 with the sequence of the subjective items. The configurations described are preferably made by stored program instructions as is well-known to those of ordinary skill in the art.

The computers described in FIGS. 6 and 7 can operate under a set of stored instructions written in accord with the various embodiments of the method shown.

Referring to FIG. 8, the block diagram of a timing and moving sequence used in the connection with displays 58 and 402 of FIGS. 2 and 7 will be explained. FIG. 8 describes the different timing and movement sequence for data placed on displays 58 or 402 depending on whether the item being displayed is known or unknown. Based on whether the item is known or unknown, the timing and movement sequence follows one of two alternative paths A and B. Path A describes the timing and movement sequence for an unknown item.

Referring to block 502 along path A for an unknown item 500, the time a question pertaining to the unknown item is displayed on displays 58 and 402 can be modified by the user. In other words, the user can make the questioning go faster or slower. At the beginning of the question, the user is queried as to whether he wishes to go faster or slower and that the system can adjust the timing appropriately. If the user does not select the timing sequence, a default setting is used. The next step along path A for unknown item 500 is to set the time interval between displaying the question and displaying the answer. As shown in block 504, the time is displayed essentially simultaneously with the question with audio feedback such as a beep. At block 506, the answer for unknown item 500 is displayed differently from known items 510. If the item is unknown, the answer can be spelled out on displays 58 and 402 one letter at a time, while the question remains displayed on the screen. Once the question and answer have been fully displayed at block 508, the user can select the time before the next unknown item is displayed.

Referring now to path B of FIG. 8 for known items 510. The time a question is on the screen at block 512 is the same as block 502 for unknown items and is completely user selectable. Block 514 relates to the time before the answer is displayed and differs for known items. The time interval at block 514 is user selectable so that the user can select the time interval between the question and the answer is displayed on displays 58 and 402. At block 516, relating to displaying the answer, is different for known items. For known items 510, the answer is displayed on displays 58 and 402 completely, and then is repeated a number of times, one after the other.

By way of example, if the paired question and answer are Thank you and Gracias, the answer is Gracias. At block 506, the answer will be spelled out one letter at a time: "G-r-a-c-i-a-s", whereas in block 516, the answer will be spelled out "Gracias" and then repeated three times, Gracias, Gracias, Gracias. The time before the next question is displayed is also user selectable as is shown at block 508 for unknown items.

While the prior art often uses repeated rhythmic stimulation to reduce the distractions imposed by the external world, the rhythm of the invention is never constant and rhythmic, but the rate of the invention's repetitions is always changing (faster or slower) and can always be changed in direction by the student who must always choose faster or slower with every successful experience. The timing of the invention is always increasing or decreasing at a rate just above and just below the just noticeable difference level of the student. In this way, the device cycles through a range of frequencies without ever stopping on one specific repetition rate.

The prior art has demonstrated that there appear to be optimal mind states for different types of tasks. The optimal state for metaphorical, literary, analog or spatial learning is likely the alpha state; for logical or computational problems, the beta state. For learning material that has been unfamiliar and foreign to the user's previous experience or material reflecting points of view that differ widely from the person's basic beliefs, a theta state is recommended. These states represent brain waves of different frequencies in cycles per second and are simulated by letters per second and words per second and information per second in the displays 58 in FIG. 2 and 402 in FIG. 7. Again, the invention does not present material consistently at any of these rates, but cycles through a variety of presentation rates to maintain attention and obtain unique learning results.

While the prior art shows that students need visual acuity in order to learn, learning typically occurs with eye movement, the eyes of the student tracking the material to be learned. Aside from the pathologies of the human eye and brain, the task of eye movement involves the coordination of cranial nerves and eye muscles. In the preferred embodiment of the method of the invention, the student selects the point of greatest visual acuity and the task for learning is set so that the student's eyes can remain fixed without having to move in order for learning to take place. The presentation of questions and answers is restricted in size so that the ratio of readable type in height to the width of that type is at all times accessible to the student without eye movement being required for learning to take place. Each student sets the distance of visual acuity by adjusting the distance between the eyes and the display screen.

From the above description it will be seen by those having ordinary skill in the art that under the present invention, a method and apparatus is provided that focuses on the user's perceived knowledge of an item and does not require the user to actually know the item. In this way, improved automated learning and performance evaluation can be achieved. Since the invention may be incorporated into a microprocessor based stored program digital computer or a removable storage device, a wide variety of learning methods may be provided. While the invention has been particularly shown and described with reference to a preferred embodiment, it will be understood by those of ordinary skill in the art that various other changes in form and detail may be made without departing from the spirit or scope of the invention.

What is claimed is:

1. An apparatus for teaching items to a user comprising:
    memory means for storing a file of said items;
    visual display means for presenting each item to said user in such a way that the user's eyes do not have to track across the display;
    input means for receiving a response from said user for each item; and
    processor means, responsive to said user's response, for sorting said items into groups of subjectively known items and subjectively unknown items and for generating a sequence of one subjectively unknown item and a plurality of subjectively known items.

2. The apparatus of claim 1, further comprising means for timing.

3. The apparatus of claim 2, wherein said timing means measures the time of said user's response.

4. An apparatus for teaching a group of items to a user comprising:
    means for displaying each of said items in said group to said user in such a way that the user's eyes do not have to track across the display;
    means for receiving a response from said user associated with each of said items;
    means responsive to said receiving means and for sorting said items into a group of known subjective items and a group of unknown subjective items; and
    means for generating a list of said subjective items in a sequence including in said list at least one each of said known and unknown subjective items and supplying said list to said display means.

5. The apparatus of claim 4, wherein said list has one unknown subjective item and a plurality of known subjective items.

6. The apparatus of claim 5, wherein said known subjective items are randomly selected.

7. An apparatus for teaching a group of items to a user where each of said items has a paired response, said apparatus comprising:
    means for displaying each of said items in said group to said user in such a way that the user's eyes do not have to track across the display and for soliciting a response from said user;
    means for receiving said response from said user;
    logic means responsive to said receiving means and for sorting said items into two groups of known subjective items and unknown subjective items; and
    means for generating a sequence of said subjective items including in said sequence at least one unknown subjective item and a plurality of known subjective items and supplying said sequence of items to said display means along with said paired response.

8. The apparatus of claim 7, wherein said sequence has a predetermined order of said unknown subjective item and said plurality of known subjective items.

9. The apparatus of claim 8, wherein said sequence includes at least one repetition of said unknown subjective item.

10. The apparatus of claim 9 further comprising means for controlling presentation of said sequence of items and paired responses by said display means.

11. The apparatus of claim 10, wherein said controlling means presents said unknown subjective item together with its paired response.

12. The apparatus of claim 10, wherein said controlling means presents said known subjective item at a first time and presents its paired response at a later time.

\* \* \* \* \*